United States Patent [19]

Takeda et al.

[11] Patent Number: 5,343,560
[45] Date of Patent: Aug. 30, 1994

[54] IMAGE DATA DISPLAY SYSTEM

[75] Inventors: Haruo Takeda, Kawasaki; Kuniaki Tabata, Tokyo, both of Japan

[73] Assignee: Hitachi, Ltd., Tokyo, Japan

[21] Appl. No.: 851,679

[22] Filed: Mar. 11, 1992

Related U.S. Application Data

[63] Continuation of Ser. No. 437,106, Nov. 16, 1989, Pat. No. 5,150,462, which is a continuation of Ser. No. 67,014, Jun. 29, 1987, abandoned.

[30] Foreign Application Priority Data

Jun. 27, 1986 [JP] Japan ............... 61-149510

[51] Int. Cl.$^5$ ............................. G06F 15/00
[52] U.S. Cl. ........................ 395/166; 395/164
[58] Field of Search ............... 395/162, 163, 164, 150, 395/127, 166; 340/706, 747, 750, 798, 799; 345/129, 130, 27, 28

[56] References Cited

U.S. PATENT DOCUMENTS

| | | | |
|---|---|---|---|
| 4,631,690 | 12/1986 | Corthout et al. | 395/163 |
| 4,845,612 | 7/1989 | Sakai et al. | 395/150 |
| 4,855,937 | 8/1989 | Heartz | 395/127 |
| 4,949,280 | 8/1990 | Littlefield | 395/163 |

*Primary Examiner*—Phu K. Nguyen
*Attorney, Agent, or Firm*—Antonelli, Terry, Stout & Kraus

[57] ABSTRACT

An image data display system comprises a file unit for storing image data in compressed form, a display unit for displaying image data, a table for storing address information of a plurality of image data to be read from the file unit, a buffer memory having a memory area corresponding to at least two image frames for temporarily storing image data read from the file unit, an expansion processor for expanding image data in the buffer memory, a bit map memory for storing expanded image data, an output unit for outputting image data in the bit map memory to the display unit, an input unit for inputting a first command instructing a successive display of image data and a second command instructing a halt of the successive display, and a control unit responsive to the first command for switching in a predetermined order the buffer memory area used for storing image data read from the file unit and the buffer memory area used by the expansion processor and successively reading image data from the file unit while referring to the table, and responsive to the second command for halting the read operation of image data from the file unit, whereby a desired image frame successively displayed is rendered in a still state by the second command from the input unit.

22 Claims, 8 Drawing Sheets

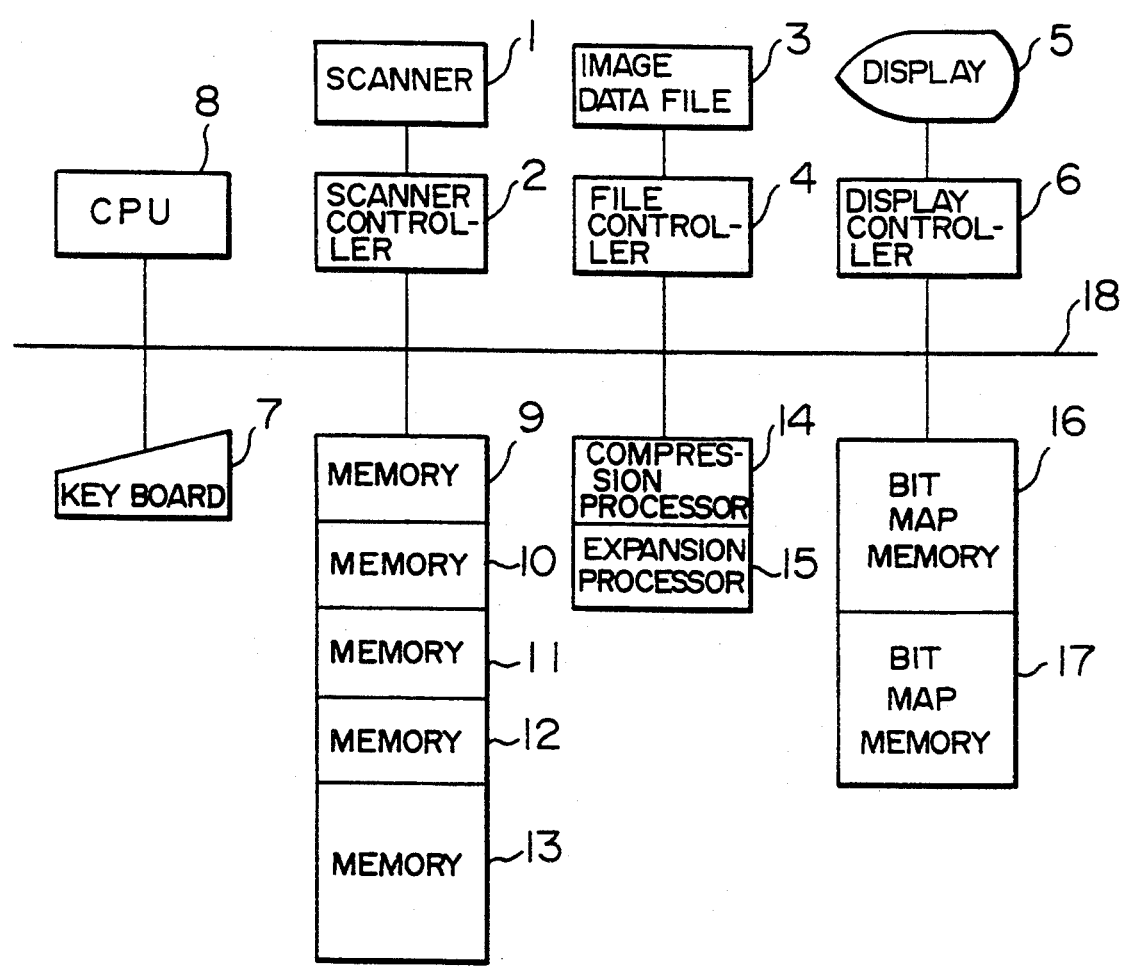
F I G. 1

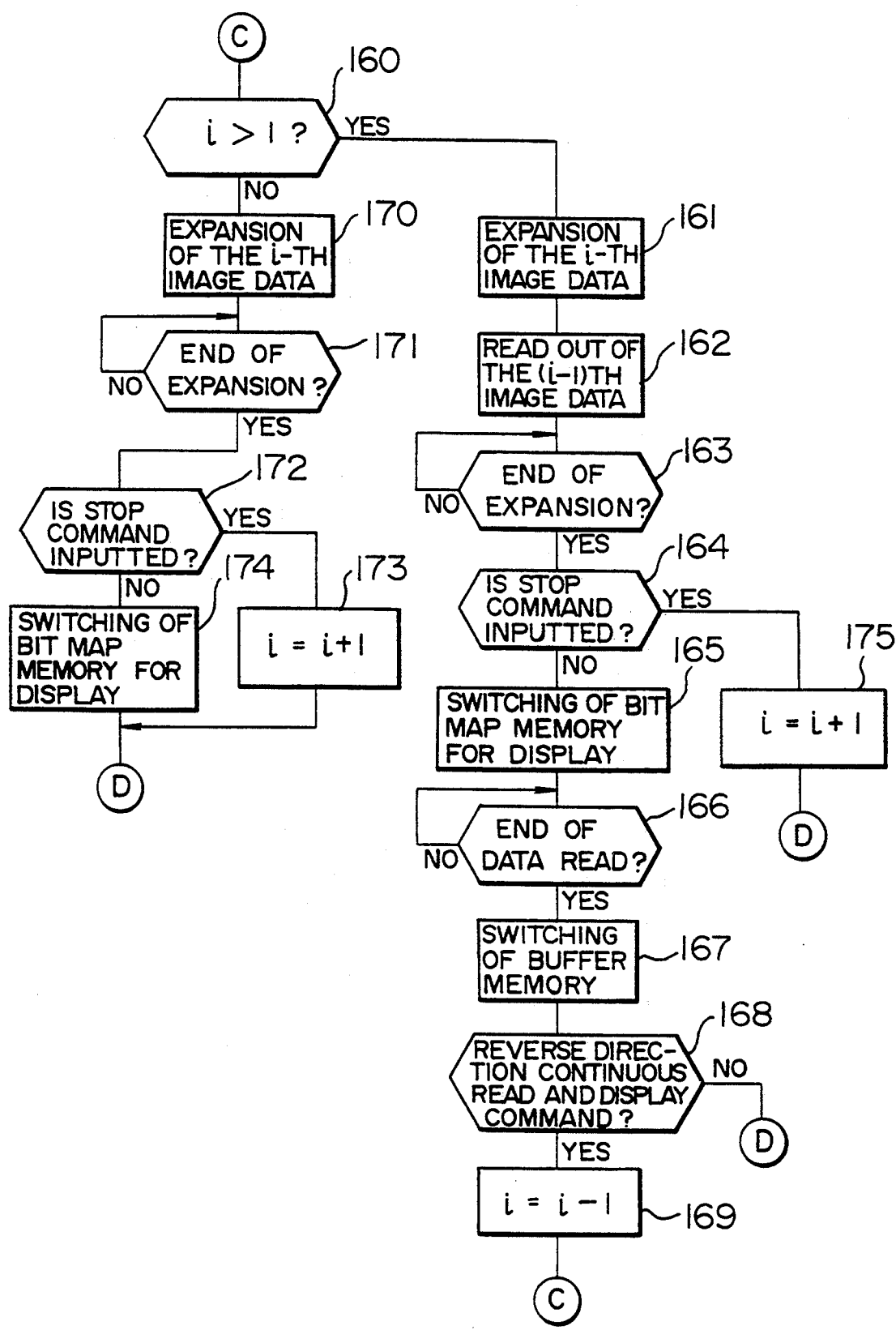
F I G. 2C

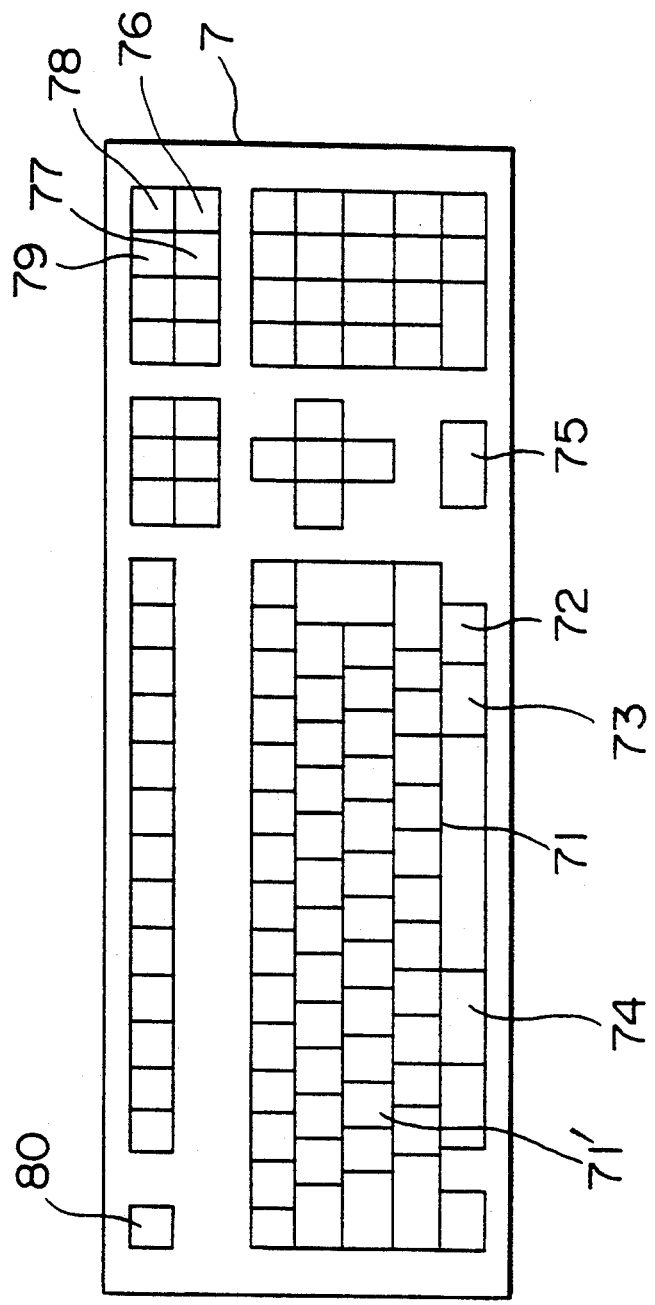

F I G. 5

| RECORD NO. 84 | CLASS OF INDEX 81 | HEAD ADDRESS OF IMAGE DATA 82 | SIZE OF IMAGE DATA 83 | |
|---|---|---|---|---|
| 1 | SPEC. OF PATENT | n1 | S1 | 85-1 |
| 2 | SPEC. OF PATENT | n2 | S2 | |
| ⋮ | | | | |
| i | SPEC. OF PATENT | ni | Si | 85-i |
| ⋮ | | | | |
| $\ell$ | SPEC. OF PATENT | n$\ell$ | S$\ell$ | 85-$\ell$ |

80

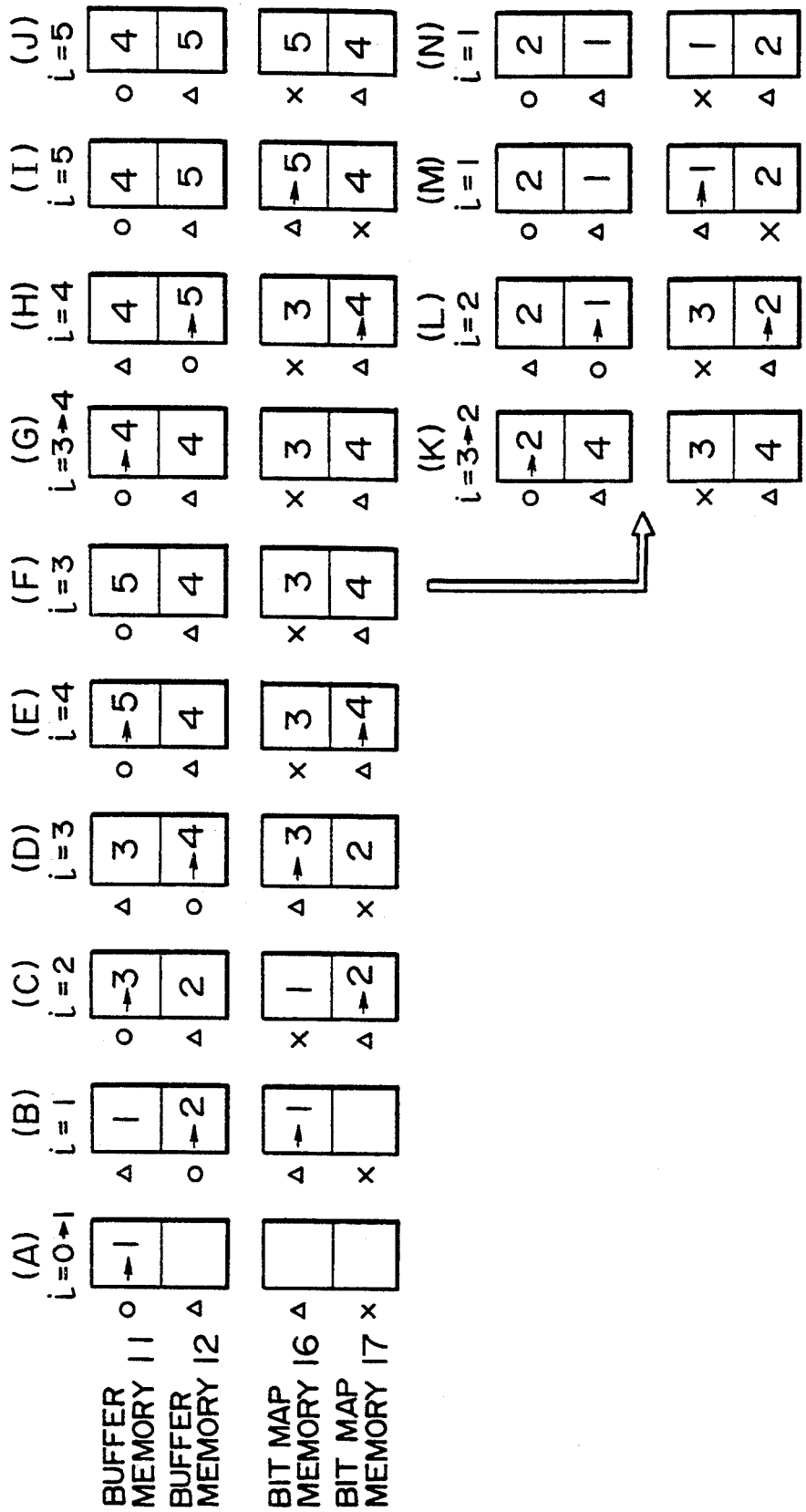

IMAGE DATA DISPLAY SYSTEM

This is a continuation of application Ser. No. 437,106, filed Nov. 16, 1989 now U.S. Pat. No. 5,150,462 which is a continuation of application Ser. No. 067,014 filed Jun. 29, 1987, now abandoned.

BACKGROUND OF THE INVENTION

The present invention relates to an image data display system and more particularly to an image data display system for sequentially displaying a plurality of image data read from an image file.

DESCRIPTION OF THE RELATED ART

Recently, a document image file system (electronic file) using a large capacity optical disc has become noticeable as a new means for document management. An optical disc has a large storage capacity enough to record image data and accordingly, can store document image information such as an account sheet, a design drawing, a contract and the like. An index such as a document name, a classification name or a key word may be used to retrieve a document. However, it takes time for an entry of a document image if a complicated index is added thereto. In addition, a complicated index often becomes difficult to be recalled when a document is to be retrieved. Therefore, a simple index such as a classification name is often used in practice. Further, a stored image having a complicated index is commonly retrieved designating a simple index. In this case, after inputting a simple index such as a classification name to retrieve an objective document, the operator must visually confirm the contents of a plurality of candidate data sequentially displayed on a display screen.

In a known document image retrieval method, for example, as disclosed in "Operation Manual (No. 60-10-001-20) for Optical Disc File System" by Hitachi at pp. 6 to 7, a page is turned one after another upon operation of a succeeding page key or a next page key. With this method, a table is provided for storing the file addresses of a plurality of images obtained by an index retrieval. The address (pointer) of an image to be displayed is changed by one in a predetermined order every time the key is operated. Based on the address, compressed (or coded) image data stored in the image file is sequentially read therefrom and expanded (or decoded) to display it on the display screen.

According to the above conventional image data display system, a key is operated for each image which in turn is read, expanded and displayed. This process is sequentially repeated if the number of image data to be displayed is large. Thus, there arises a problem that it takes a long time to retrieve an objective document.

SUMMARY OF THE INVENTION

It is an object of the present invention to provide an image data display system capable of visually selecting a desired image data in short time while a plurality of image data are sequentially and successively displayed at high speed.

To achieve the above object, the image data display system of this invention includes: a file unit for storing image data in compressed form; a display unit for displaying image data; table means for storing address information of a plurality of image data to be read from the file unit; a buffer memory having a memory area corresponding to at least two frames for temporarily storing image data read from the file unit; means for expanding image data in the buffer memory; a bit map memory for storing expanded image data; means for outputting image data in the bit map memory to the display unit; input means for inputting a first command instructing a successive display of image data and a second command instructing a halt of the successive display; and control means responsive to the first command for switching in a predetermined order the buffer memory area used for storing image data read from the file unit and the buffer memory area used by the expansion means and successively reading image data from the file unit while referring to the table means, and responsive to the second command for halting the read operation of image data from the file unit; whereby a desired image frame on the display unit successively displaying image data can be rendered in a still state by the second command from the input means.

According to the present invention, as the operator inputs an index such as a classification name, a retrieval process starts forming a table having addresses of corresponding image data in the file. Then, as the operator inputs through a keyboard a command instructing a successive display of corresponding image data, a first compressed image data is read from the file in accordance with the first address in the table and stored in one memory area of the buffer memory. While the first compressed image data is expanded and displayed on the display unit, a second compressed image data is read from the file in accordance with the next address in the table and stored in another memory area of the buffer memory. Similarly, while the second, third and following image data are expanded and displayed, the third, fourth and following image data are read from the file. Thus, image data corresponding to the inputted index are sequentially and succeedingly displayed on the display unit at high speed. If an objective image data is displayed, the operator inputs through the keyboard a command instructing a stop of the successive display. A still image of the objective image data is thus obtained so that the operator can check the contents thereof precisely and, if necessary, perform various other processings such as printing and transmitting the contents.

The bit map memory may have a memory capacity corresponding to at least two image frames. In this case, while the contents of one frame memory area is displayed on the display unit, the other frame memory area is switched to store expanded image data. In this manner, a successive display instantaneously changing from one frame to another can be realized. Alternatively, the bit map memory may have a memory capacity corresponding to one frame. In this case, a successive display can be realized wherein while an image data expansion process continues, one frame image data is displayed and gradually changed to the other frame image data from the top or bottom of the former image data.

The foregoing and other objects, advantages, manner of operation and novel feature of the present invention will be understood from the following detailed description when read in connection with the accompanying drawings.

BRIEF DESCRIPTION OF THE DRAWINGS

FIG. 1 is a block diagram showing the overall construction of the image file system according to the present invention;

FIGS. 2A to 2C are flow charts illustrating an example of control operation of the image file system;

FIG. 3 is a plan view of the keyboard 7;

FIG. 5 shows a table for storing index records of image data to be retrieved; and FIG. 6 illustrates a change in status of the buffer memories and bit map memories.

DESCRIPTION OF THE PREFERRED EMBODIMENT

Figure 2A:
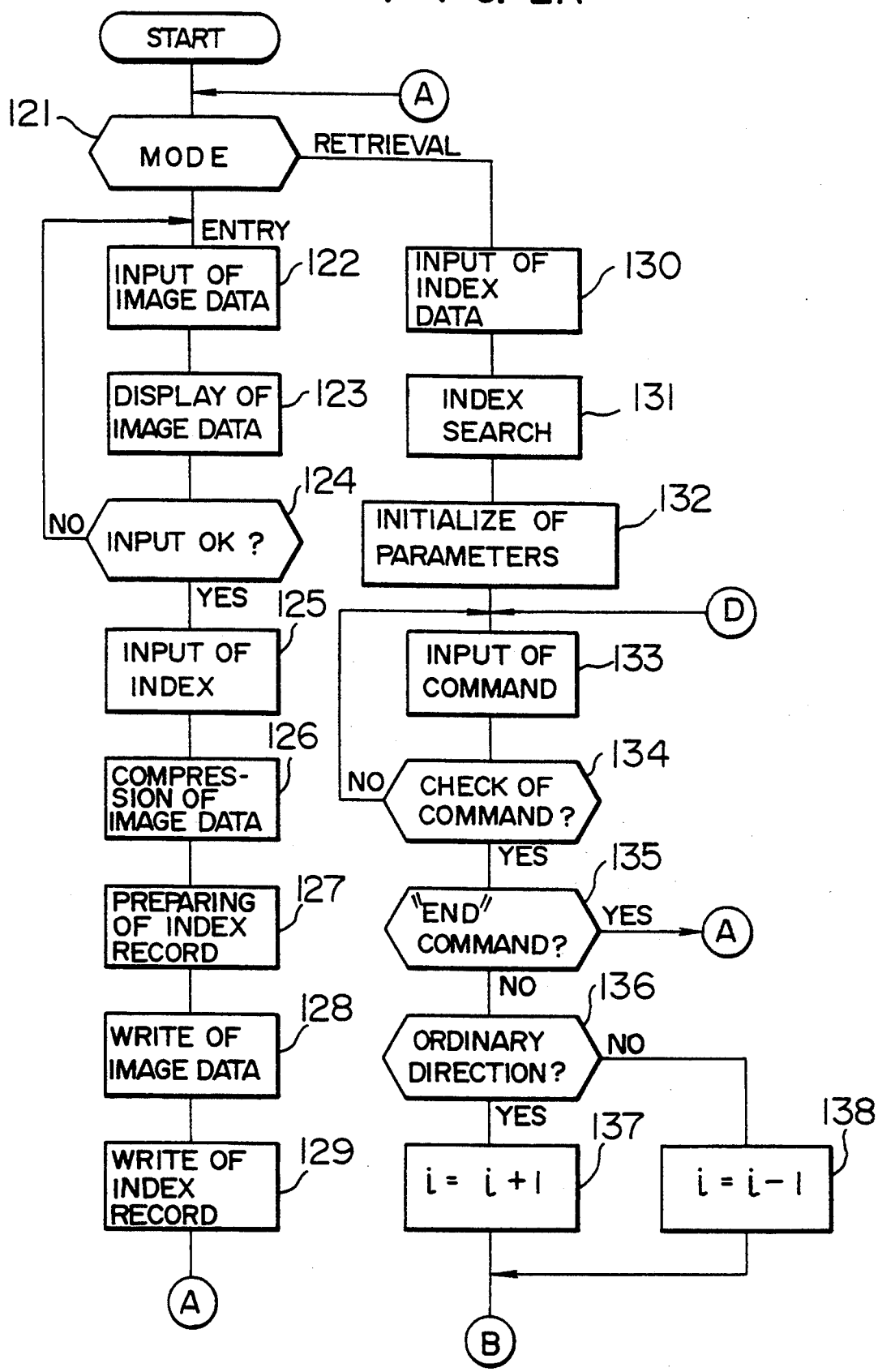

FIG. 1 shows the construction of the image file system which comprises: a scanner 1 for inputting image data; a controller 2 for the scanner 1; a file 3 including recording medium such as a magnetic disc and an optical disc and a driver unit for storing image data in compressed form; a controller 4 for controlling the operation of the file 3; a display unit 5 for displaying retrieved image data, character data and so on inputted from a keyboard 7, the keyboard being used for inputting a command, character data and specifically an index of image data; a controller 6 for controlling the display of the display unit 5; a CPU 8 for controlling the entire system; a program memory 9 for storing control programs for the CPU 8; a work memory 10 for storing variables, tables and so on used by the CPU 8; buffer memories 11 and 12 for temporarily storing compressed image data read from the file 3; a buffer memory 13 for temporarily storing original image data inputted from the scanner 1; a dedicated processor 14 for compressing (coding) original image data; a dedicated processor 15 for expanding (decoding) compressed image data; and bit map memories 16 and 17 in one-to-one correspondence with the contents displayed on the display unit 5. An instruction from the CPU 8 to the display controller 6 decides which memory contents is to be displayed on the display unit 5.

Based on an instruction from the CPU 8, the display controller 6 scans either the bit map memory 16 or the bit map memory 17 to refresh the display unit 5. In the above construction, the memories 9 to 13 and the bit map memories 16 and 17 are not always required to be physically independent, but a single memory device may be used logically to have the same construction as above. Further, as described later, some memory area may be used in common to reduce the overall memory capacity. The compression processor 14 and the expansion processor 15 also are not always required to be independent devices since they have a common circuit portion and are often implemented on the same LSI circuit in practical use.

Figure 2B:
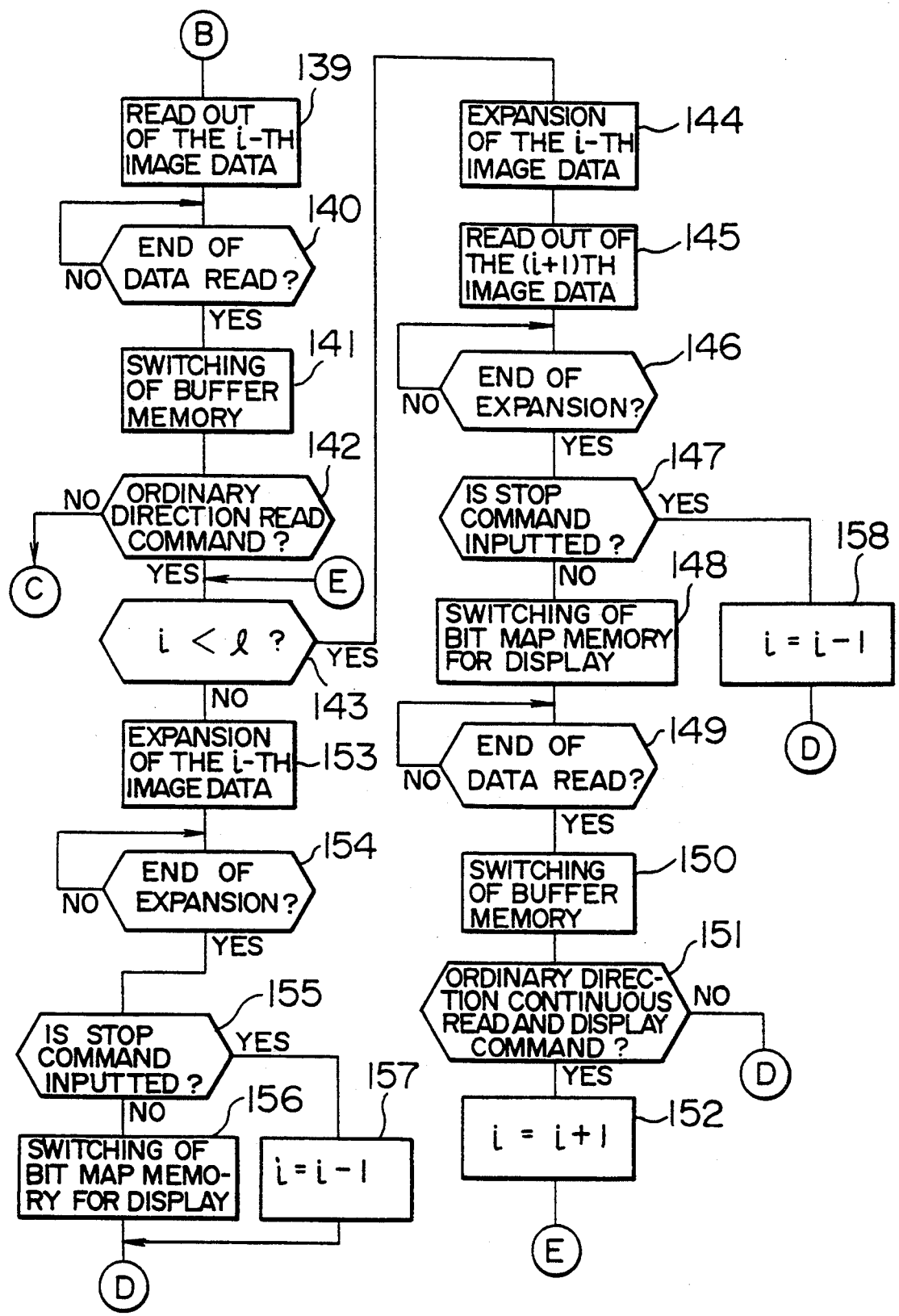

FIGS. 2A to 2C are flow charts showing an example of the operation of the image file system according to the present invention. The control programs shown by the flow charts are stored in the memory 9 and executed by the CPU 8. Entry and retrieval functions or modes can be selected at the initial condition. If an entry mode is selected through the keyboard 7, the following steps 122 to 129 are executed.

At step 122, image data inputted through the scanner 1 is temporarily stored in the image memory 13. The image data stored in the image memory 13 is transferred at step 123 to the bit map memory 16 and displayed on the display unit 5. If the operator determines that the image quality on the display unit, i.e., image inclination, position, brightness and so on, is good, then the operator can input an index of the image data inputted through the keyboard 7 to the work memory 10 (step 125). Used as the index of image data in this embodiment are only those characters designating the classification of image data, e.g., "patent specification", "thesis", "report" and so on. An example of the keyboard for inputting an index is shown in FIG. 3. To input an index of Chinese "Kanji" character string using this keyboard, the process similar to that by an ordinary word processor is carried out. Namely, a key 72 is first depressed to enter a Japanese "hirakana" character input mode and thereafter, Japanese "katakana" characters obtained through phonetic translation of the Chinese "Kanji" character string is sequentially inputted, for example, in units of words by using keys 71. Lastly, a conversion key 73 is depressed to convert the inputted "katakana" characters into Chinese "Kanji" characters. If alphabet or "hiragana" characters are used for inputting an index character string, a non-conversion key 74 instead of the key 73 is used. The end of inputting an index character string is instructed by depressing an execution key 75 in this embodiment.

The input image data stored in the memory 13 is compressed (decoded) by the compression processor 14 at step 126 and stored in the buffer memory 11. Various image data compression methods have been proposed. The methods such as the Modified Huffman method, the Modified Read (Relative Element Address Designate) method and the like may be used, which methods are disclosed for example in a Japanese literature entitled "Image Signal Processing for FAX and OA" by Takehiko FUKINUKE published by Nikkan Kogyo Newspaper, at pp. 61 to 106. At step 127, an index record is formed and stored in the memory 10. The index record includes the index indicating the classification of image data, the size (e.g., byte number) of compressed image data, and the address at the file 3 where the image data is stored as described later. The compressed image data stored in the memory 11 is written in an image data storing region of the file 3 described later (step 128). Next, the index record in the memory 10 is written in an index record storing region as described later (step 129).

Figure 4:
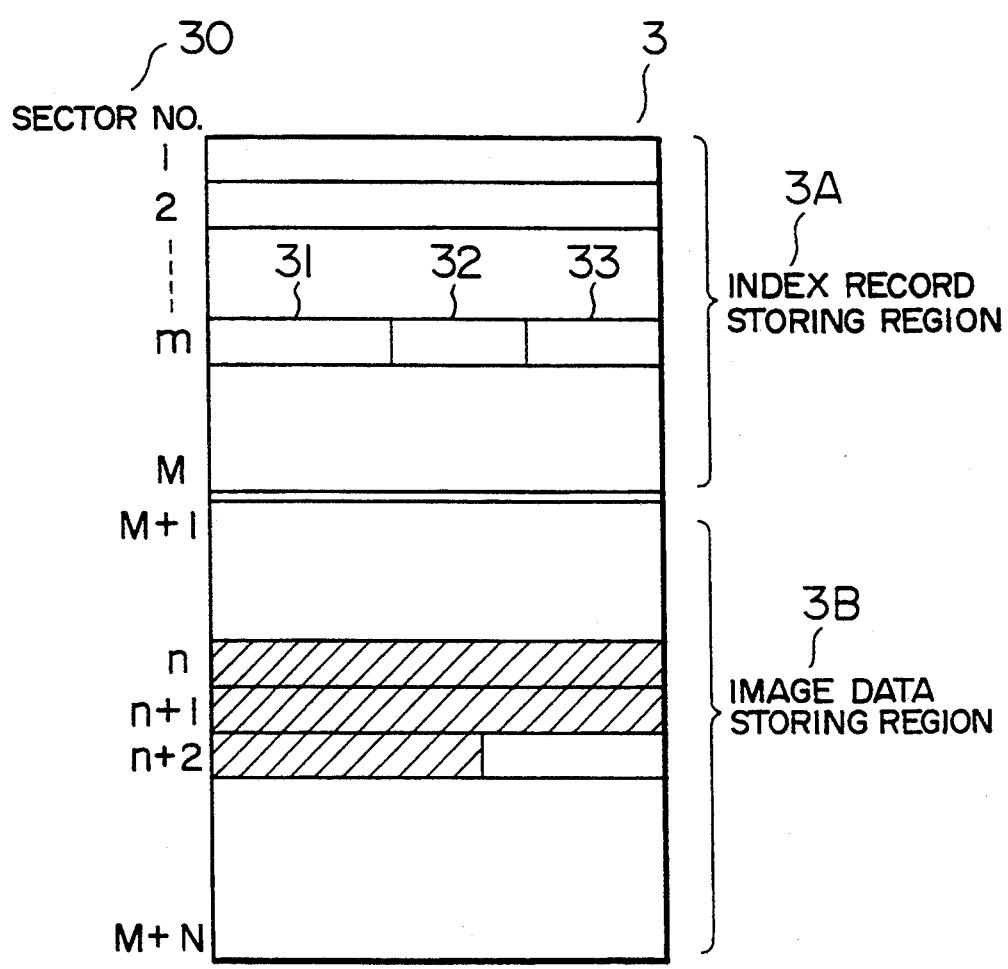
FIG. 4 is a memory map of the image file.

FIG. 4 schematically shows the memory map of a storage area of the file 3. The storage area of the file 3 is divided into an image storing region 3B for storing image data and an index record storing region 3A for storing index records used in retrieving image data. The data address in a file using a magnetic disc or an optical disc is generally identified by a track number and a sector number in the track. For the purpose of simplifying the description, it is here assumed that the address for input/output of image data can be designated only by a sector number 30 specifically allocated to all the sectors in the file. In the image data storing region 3B, one set of image data is stored in three sectors n, n+1, and n+2 indicated by oblique lines. The effective data at the sector n+2 is present only at the part where oblique lines are shown. A sector m in the index record storing region 3A is an index record region for the above image data. A character string indicating the classification name is stored in field 31, the head sector number (i.e., n) of the corresponding image data in field 32, and the size of the image data (i.e., byte number of all the parts with oblique lines in the region 3B) in field 33. In case a write-once type optical disc without a capability of physical rewriting of recording information, generally the size M of the index record storing region 3A is defined at the initialization process whereby the index record is written from the sector 1 and the image data is written from the sector M+i for each image data entry.

Next, steps 130 to 175 will be described which is executed when a retrieval process is designated at step 121 of FIG. 2A. Similar to step 125, the index of an objective image data, e.g., a character string "patent specification" indicating the classification name, is inputted to the work memory 10 through the keyboard at step 130. With the designated index, data in the index record storing region 3A are sequentially read from the memory 10 to compare them with the inputted index and collect those index records having the same index as the designated index. In accordance with the results of this index search, a table 80 shown in FIG. 5 is formed in the memory 10.

The table 80 is comprised of λ index records 85-1 to 85-λ corresponding to the designated index. Each index record is constructed of an index 81 corresponding to the field 31 shown in FIG. 4, a head address 82 of image data corresponding to the field 32, and a size 83 of image data corresponding to the field 33. The index 81 in this embodiment has only one item of classification. However, if the index 31 in the file 3 is comprised of a plurality of items such as classification, number and entry date, the index 81 is accordingly divided into corresponding items. The table 80 is formed by obtaining the index records having the classification name "patent specification" at step 131 and transferring them one after another to the table region in the memory 10. At step 132, the parameter i is initialized to "0", the parameter indicating the index record number 84 in the index table 80 for the image data to be displayed on the display unit. Also at step 132, the buffer memory 11 is designated as a memory for use in storing image data to be read from the image file 3, the buffer memory 12 as a memory for use in storing image data to be read and expanded, the bit map memory 16 as a memory for use in storing the expanded image, and the bit map memory 17 as a memory for use in reading and displaying image data.

Next, as the operator inputs a command (step 133), the availability of the command is checked (step 134). The allowable commands include, for example, those by a command key 78 for reading the retrieved image data in an ordinary direction and successively displaying them, by a command key 76 for reading and displaying one page at a time in an ordinary direction, by a command key 79 for reading the retrieved image data in a reverse direction and succeedingly displaying them, by a command key 77 for reading and displaying one page at a time in a reverse direction, and by a command key 80 for stopping the retrieval process. If the image data with the last index record number λ is being displayed on the display unit, the display commands in the ordinary direction inputted by the operator are made invalid. Similarly, if the image data with the index record number 1 is being displayed or if the system is in the initialized condition, the display commands in the reverse direction are made invalid. If an end command is inputted, the system resumes the initialized condition (step 135). It is checked at step 136 if the inputted command is a read/display command in the ordinary direction or in the reverse direction. In case of a read/display command (corresponding to key 76 or 78) in the ordinary direction, the parameter i is incremented by 1 (step 137), whereas in case of a read/display command (corresponding to key 79 or 77) in the reverse direction, the parameter i is decremented by 1 (step 138). Thereafter, the flow advances to step 139.

At step 139, referring to the table 80 and based on the contents of the items 82 and 83 of the index record 85-i corresponding to the parameter i, the image data is read from the file 3 and stored in the buffer memory 11 or 12. Selection of the buffer memory is determined by the condition at that time. In the initialized condition, the buffer memory 11 designated at step 132 is selected. After confirming the completion of reading image data at step 140, switching of the buffer memories is effected for storing the next image data to be read from the file 3. Switching from the memory 11 to the memory 12 is effected at this time, and switching from the memory 12 to the memory 11 is effected at the next time. Following this step, the flow advances to steps 143 to 158 in case where a read/display command inputted at step 133 is in the ordinary direction, whereas the flow advances to steps 160 to 175 in case of the reverse direction.

It is checked at step 143 if the parameter i is smaller than the retrieved index record number λ. If YES at step 143, the image data corresponding to the parameter i is expanded. The i-th image data stored in the buffer memory 11 in the initialized condition is expanded and transferred to the bit map memory 16 or 17 (16 in the initialized condition). The image data corresponding to the i+1 th index record number, i.e., the second image data, is read from the buffer memory 12 at step 145. The expansion process at step 144 and the read process at step 145 are executed in parallel using the bus 18 time divisionally. After confirming the completion of the expansion process at step 146, step 147 follows whereat it is confirmed if there is an end command from the operator, i.e., if the operator wishes to stop the successive display of image data and to check the presently displayed image data precisely. If not, the flow advances to steps 148 to 152. If there is an end command, the parameter i is decremented by 1 (step 158) . and the flow returns to step 133.

The bit map memories are switched to select the one for displaying the image data on the display unit 5 at step 148. Since the bit map memory 17 has been selected as the one for displaying the image data on the display unit 5 in the initialized condition, switching from the bit map memory 17 to the memory 16 is effected at this time. Simultaneously therewith, the bit map memory for storing image data to be expanded later at step 144 is switched to the bit map memory other than the above memory for the display. Since the bit map memory 17 has been selected for the display, the other bit map memory 16 is switched to store the image data to be expanded. After confirming the completion of image data reading process at step 149, switching to the buffer memory for storing image data read from the file 3 is effected at step 150. Since the buffer memory 11 was designated at step 132 and the buffer memory 12 has been selected at step 141, the buffer memory 11 is selected at step 150. An inputted command is checked at step 151. If there is still a successive read/display command in the ordinary direction, the flow advances to step 152 whereat the parameter i of the index record of the image data to be retrieved is incremented by 1 and thereafter, the flow returns to step 143. If an inputted command at step 151 is changed, the flow returns to step 133.

With the above processes, image data indicated by the index table 80 are sequentially read from the file 3, expanded and sequentially and successively displayed on the display unit. After such processes, if i=λ at step 143, i.e., if it is determined that the last image data as indicated by the index table 80 has been read from the file 3, the succeeding steps as above are not required but steps 153, 154 to 156 and 157, corresponding to steps 144, 146 to 148 and 158, are executed.

If a read/display command in the reverse direction is inputted at step 133, steps 160 to 175 are executed after steps 134 to 136, 138, and 139 to 142. These steps are similar in case of the read/display command in the ordinary direction, except steps 160,162,169,173 and 175. If i=1 at step 160, i.e., if it is determined that the image data to be retrieved is the first data indicated by the index table, the read process in the reverse direction is not requested. Thus, only steps 170 to 174, corresponding steps 161, 163 to 165 and 175, are executed. Contrary to step 145, the preceding image data is read at step 162. Also, contrary to step 152, the parameter i is decremented by 1 at step 169 and the following steps 160 to 169 are repeated.

Next, the status change of the buffer memories 11 and 12 and the bit map memories 16 and 17 during the control operation described by the above programs, particularly during the successive display mode, will be described with reference to FIG. 6. In the Figure, a "circle" symbol indicates a buffer memory for use in storing image data read from the file 3 at step 139, 145 or 158, a "triangle" symbol indicates a buffer memory for storing image data to be expanded at step 144, 152, 161 or 170, and a bit map memory for storing expanded image data, and an "x" symbol indicates a bit map memory for storing image data to be displayed on the display unit 5. The display controller 6 uses those bit map memories indicated by an x symbol for refreshing the displayed image data. The numeral in each memory block in FIG. 6 indicates the index record number 84 of the image data to be stored. In this example, the number λ of image data to be retrieved is "5". An arrow in front of the numeral in each memory block means that the memory contents are changed to those of the image data having an index number indicated by the numeral.

First, the index table 80 for the five sets of image data retrieved at step 131 is formed in the memory 10. At step 132, the status "A" of "circle", "triangle" and "x" symbols is determined. If a successive read/display command in the ordinary direction is inputted, the parameter i is changed from 0 to 1 at step 137. The first image data is then stored in the buffer memory 11 at step 139. After the completion of storing the image data, the buffer memory is switched at step 141 to obtain status "B". At status "B", simultaneously with storing the first image data expanded at step 144 in the bit map memory 16, reading the second image data and storing it in the buffer memory 12 is executed at step 145. After the completion of expansion, the "triangle" and "x" status of the bit map memories is exchanged at step 148, thus resulting in status "C" whereat the first image data stored in the bit map memory 16 is displayed on the display unit 5. Steps 143 to 151 are repeated to change status from "C" to "E" while sequentially displaying the second and third image data.

Assume that the operator has inputted an end command at the time when the third image data is being displayed. After confirming the completion of expansion of the fourth image data at status "E" step 155 is executed omitting steps 148 to 151. Consequently, the "circle" "triangle" and "x" status "E" does not change to status "F" but the parameter i changes from 4 to 3 at step 157 and the flow remains stopped at step 133. If the operator again inputs a successive read/display command in the ordinary direction, the parameter i is changed to 4 and thereafter, the fourth image data is read at step 139 to obtain status "G". The flow proceeds up to status "I" being same as status "B". At this status, since the parameter i is 5 which equals the index record number λ, the flow changes from step 143 to step 153 whereat the fifth image data is expanded. At step 156 the "triangle" and "x" status of the bit map memories is exchanged to obtain status "J" with the fifth image data displayed. The flow returns to step 133 to wait for the next command.

If the operator inputs a successive read/display command in the reverse direction at status "F" the parameter i is changed to 2 at step 138 and thereafter the second image data is read at step 139 to obtain status "K". Since step 160 follows after step 142, the second image data is displayed in a similar manner to obtain status "M". In this status, the parameter i is 1 so that step 170 follows after step 160 to expand the first image data. At step 174, the "triangle" and "x" status of the bit map memories is exchanged to obtain status "N" with the first image data displayed. The flow returns to step 133 to wait for the next command.

In the above embodiment, five individual command keys 76–80 are prepared for designating an operation mode of image display. However, these commands may be designated by using a reduced number of command keys, for example, a next page key and a former page key. A command for reading and displaying the next one page at a time in an ordinary direction can be inputted by pushing the next page key and releasing it within a predetermined time period. If the next page key is held in the pushed state over the time period, it is judged that a command for successive reading and displaying of image data in an ordinary direction is inputted. Similarly, a command for reading and displaying the next one page at a time in a reverse direction can be inputted by pushing the former page key and releasing it within a predetermined time period. If the former page key is held in the pushed state, it is judged that a command for successive reading and displaying of retrieved image data is inputted. A command for stopping the retrieval process can be judged by detecting the release of key which has been pushed over the time period.

In the above embodiment, the time interval required for replacing the displayed image in successive display mode depends on the time limit for reading respective image data from the image data file 3 to the memory 11 (12), or the time limit for expansion of the image data in the memory 11 (12). However, it is possible to make variable the above time interval by providing the control program shown in FIG. 2B with loop routines of no operation, for example, before the step 148,156, 165 and 174, respectively. In this case, the operator inputs a numeric value from key board 7 to designate the degree of display interval so that the loop routine is executed repeatedly so many times in proportion to the inputted numeric value. By this function, the operator can change the speed of page flipping arbitrarily.

The image data entry and retrieval modes are executed independently as described in the above description. Therefore, the memory 13 required only during the image data entry mode may be used physically in common with any one of the buffer memories 11 and 12 and the bit map memories 16 and 17.

Although only one expansion processor 15 for image data is used in the above embodiment, the number of expansion processors may be changed especially when the image file 3 having a high data read speed is used and image data is sequentially read and displayed on the display unit at a speed matching the data read speed of the image file. Such an arrangement includes two expansion processors and buffer memories and bit map memories, the latter two memories respectively having a memory capacity corresponding to three frames, or three expansion processors and buffer memories and bit map memories, the latter two memories respectively having a memory capacity corresponding to four frames. Provision of bit map memories having a memory capacity corresponding to a plurality of image frames enables to display one frame while storing expanded image data in another image frame, so that a switch from one image data to another image data on the display unit can be performed instantly, resulting in an image data easy to observe and substantially still. The bit map memories 16 and 17 may be used in common, with the display contents gradually changed from one image data to another image data. In this case, switching the bit map memories in the control flow charts is not needed to thus reduce the memory capacity of the bit map memory.

The above embodiment of the image file system is applied to both image data entry and retrieval. Generally, it is easy for a file medium such as an optical disc to be dismounted from one system and mounted on another system. In view of this, the present invention may be applied to a system with only a retrieval function and without an entry function, whereby a file medium with image data recorded in another system may be used to display the retrieved image data at high speed. In this case, the scanner 1, scanner controller 2, compression processor 14 and image memory 14 shown in FIG. 1 are not needed, and steps 122 to 129 in the control program shown in FIG. 2 can be omitted. Obviously, the image display system according to the present invention is also applicable to the system wherein the file 3 is located in a remote side and the display terminal is connected to the file 3 via a communication line or radio transmission. Further, each command is allocated to a specific control key of the keyboard in the above embodiment. However, each command may be allocated to a specific character string inputted using character keys 71 or a specific key selected from the character keys 71.

As seen from the foregoing description of the present invention, an image data is stored in the image file in compressed form. Two functions can be selectively switched, one for successively displaying a plurality of image data at a speed substantially equal to the data read speed of the image file, and the other for obtaining a still image or changing to the next image in response to a command from the operator. As a result, an objective image data from a plurality of retrieved image data can be found in short time.

We claim:

1. An image data display system for displaying image data frames specified by a user comprising:
   file means for storing a plurality of image data frames of variable length image data in compressed form and for permitting random access;
   access means for reading out image data frames in compressed image data form specified by the user one after another from said file means in a time period TR for one frame, the time period TR being variable depending on the contents of each image data frame;
   means for expanding image data frames in the compressed image data form read out by said access means from the compressed image data form to an uncompressed expanded image data form in a time period TE for one frame, the time period TE being variable depending on the contents of the image data frames to be expanded and the time period TE overlapping in time with the time period TR for a succeeding frame;
   screen means for displaying the image data expanded by said expanding means in the uncompressed expanded image data form; and
   control means for holding a frame of image data in said screen means a period of time t after the previous frame of image data has been displayed in said screen means, wherein the period of time t overlaps in time with the time period TE of the succeeding frame, and wherein $TR+TE>t>TE$ for each frame, and for controlling the access means, processing means and screen means to iterate the reading, expanding, displaying and holding until either a halt command is inputted or all image data frames specified are displayed, wherein the time periods TR and TE start for each frame prior to the end of the period of time t for a preceding frame.

2. An image displaying method for successively outputting on a display screen an image data of a plurality of pages stored in a random access file unit in data compressed form, comprising the steps of:
   a first step of reading an image data of a first page from said file unit to a first one of a plurality of areas of a buffer memory;
   a second step of performing a process for expanding an image data of a second page, which has already been read in a second one of said plurality of areas of said buffer memory, in parallel or simultaneously with said first step;
   a third step of replacing a third page of image data displayed in said display screen by an image data of a fourth page of image data of which an expanding process has been performed, after completion of at least one of said first and second steps, the fourth page being displayed on the display screen in parallel with said second step;
   a fourth step of allocating said second or another one of said plurality of areas of said buffer memory for use in said first step and said first one of said areas used in said first step for use in said second step in a predetermined order, and designating a fifth page of an image data to be read in said first step as said first page; and
   repeating said first through fourth steps to successively display a plurality of pages of image data on said display screen.

3. Image display method for successively outputting on a display screen an image data of a plurality of pages stored in a random access file unit in data compressed form, said method comprising the steps of:
   waiting for a viewer to enter a page advance command after displaying one page of image data in response to a first user entered command for designating to advance the output on said display screen page by page; and
   automatically displaying the plurality pages of image data successively in response to a second user entered command for designating to successively display a plurality of pages of image data on said display screen until a stop command is inputted by the viewer;

wherein said automatically displaying step includes the steps of:

reading an image data from said file unit to an area of a buffer memory, expanding an image data which has already been read in another area of said buffer memory, in parallel with said reading step, outputting on the display screen an image data of which an expanding process has been performed, in parallel with said expanding step, and repeatedly performing said reading, and expanding outputting steps.

4. An image data display method for successively outputting on a display screen image data of a plurality of frames stored in compressed form in a random access file unit, comprising the steps of:

specifying a plurality of image data frames to be displayed in the display screen;

thereafter reading out the specified image data frames one after another from the file unit;

expanding the specified image data frames successively in parallel with said reading step; and displaying a frame of the specified image data expanded by said expanding for observation of the displayed image data by replacing a preceding image data frame displayed in said display screen with said expanded image data, frame by frame in synchronization with the completion of expansion of each image data frame.

5. An image display method according to claim 4, further comprising a step of designating a period of time to display each frame of image data on the display screen, and wherein said replacing is carried out in accordance with the period of time if said expanding has been completed within a time period shorter than the period of time measured from an immediately previous said replacing.

6. An image display system for sequentially and successively displaying pages of image data by turning the pages one after another on a screen for a viewer, comprising:

file means for storing the image data in a compressed image data form;

first and second buffer memory areas;

access means for reading the image data in the compressed image data form from said file means and alternatively writing read image data into said first and second buffer memory areas;

processing means for expanding the image data in the compressed image data form into an uncompressed image data form;

said processing means reading the image data from said first and second buffer memory area alternately and out of phase with said access means, so as to read image data from one of said first and second buffer memory areas while said access means is writing the image data into the other of said first and second buffer memory areas, so that said access means and said processing means operate in parallel;

first and second bit map memory areas;

said processing means writing the image data in the uncompressed image data form into one of said first and second bit map memory areas selected alternately;

display means having a screen for displaying at least one page of image data;

control means for reading image data from said first and second bit map memory areas alternately and out of phase with said processing means so as to read image data from one of said first and second bit map memory means while said processing means is writing other image data into the other of said first and second bit map memory areas, so that said control means and said processing means operate in parallel;

said control means writing the image data in pages successively and sequentially on said screen; and means for coordinating said access means, said processing means and said control means to automatically and manually, respectively, perform one and the other of holding and turning the pages of image data displayed on said screen.

7. An image display system according to claim 6, wherein said means for coordinating performs automatic holding and manual turning.

8. An image display system according to claim 6, wherein said means for coordinating performs automatic turning and manual holding.

9. An image display system according to claim 8, wherein said means for coordinating includes means responsive to user input for determining the frequency of the automatic page turning.

10. An image display system according to claim 6, wherein said first and second bit map memory areas are each of sufficient capacity to store one page.

11. An image display system according to claim 6, wherein said first and second buffer memory areas are each of sufficient capacity to store one page.

12. An image display system according to claim 6, wherein said means for coordinating automatically turns the pages at an image data display rate substantially equal to a reading rate of said access means.

13. An image display system according to claim 6 wherein said means for coordinating functions so that while one page of image data is being expanded to uncompressed image data form and displayed on said screen, a succeeding page of image data in compressed form in read from said file means.

14. An image display system according to claim 6 wherein said means for coordinating includes means to hold an address for controlling reading by said access means and increments or decrements the address.

15. An image display system according to claim 14 including means responsive to user input to determine a range of addresses to be used by said means for controlling.

16. An image display system according to claim 15, including means responsive to user input and the range of addresses to determine one of incrementing and decrementing for said means for coordinating.

17. An image display system according to claim 6, including a single memory device logically divided into said first arid second buffer memory areas and said first and second bit map memory areas.

18. An image display system according to claim 6 wherein said first arid second bit map memory areas and said first and second buffer memory areas have some memory area used in common to reduce the overall memory capacity.

19. An image display system according to claim 6, including a bus connecting said access means, said processing means and said control means for data transfer, and said means for coordinating executes the expanding by said processing means and the reading by said access means in parallel using said bus time divisionally.

20. An image display system according to claim 6, wherein said control means automatically switches between said first and second buffer memory areas to be used by said access means and said processing means, switches between said first and second bit map memory areas to be used by said display means and said processing means, and provides said access means with a read signal and said processing means with a start signal while a page of image data already resides in said display screen.

21. An image display system according to claim 6, for displaying successive ones of plural image data and halting the display at a displayed image data desired by a user viewing the displaying, further comprising:

table means for storing address information of the plurality of image data to be read from said file unit;

input means for inputting from the user a first command instructing successive display of the image data and a second command instructing a halt of the successive display;

said means for coordinating being responsive to said first command for automatically switching image data read from said file unit from one buffer memory area to another buffer memory area and automatically switching input of said processing means from a buffer memory area to another buffer memory area in a predetermined order, such that different buffer memory areas are used at the same time for storing compressed image data read out from said file unit and providing input to said processing means;

said means for coordinating being responsive to said second command for halting said automatic switching, said expanding and all reading; and wherein a desired image data on the display screen is rendered by said control means to stay on the display screen in response to the second command inputted by said user from said input means after a plurality of image data have been successively displayed on the display screen in response to the first command.

22. An image display system comprising:

file means for storing a plurality of pages of variable length image data in compressed form;

table means for storing index information corresponding to image data and correlated address information for accessing image data in said file means;

buffer memory means divided into at least two memory areas each of which has a memory capacity capable of storing one unit of compressed image data read out from said file means;

means for expanding image data stored in said buffer memory means;

bit map memory means divided into memory areas each for storing image data of an expanded unit by said means for expanding;

means for displaying image data stored in said bit map memory means on a display screen;

input means for inputting, by a user, search index information to specify image data to be retrieved and operation commands one of which designates a successive or page display mode of image data display on said display screen; and control means responsive to said table means and search index information inputted by the user for successively reading out from said file means a plurality of units of image data and automatically changing said memory areas of said buffer memory means such that each memory area of said buffer memory means stores the image data for a successive unit, for operating said means for expanding in parallel with the reading, for automatically changing said memory areas of said bit map memory means such that each memory area of said bit map memory means stores an expanded unit of image data and to be accessed by said means for displaying when said input command designates a successive display mode, and for operating said means for expanding in parallel with said means for displaying accessing said bit map memory.

* * * * *